(12) United States Patent
Thelen et al.

(10) Patent No.: US 6,779,400 B1
(45) Date of Patent: Aug. 24, 2004

(54) METHOD AND APPARATUS FOR DETERMINING THE UNBALANCE OF A ROTATING BODY

(75) Inventors: Dieter Thelen, Modautal (DE); Michael Stork, Darmstadt (DE)

(73) Assignee: Schenck Rotec GmbH, Darmstadt (DE)

( * ) Notice: Subject to any disclaimer, the term of this patent is extended or adjusted under 35 U.S.C. 154(b) by 43 days.

(21) Appl. No.: 09/633,681

(22) Filed: Aug. 7, 2000

(30) Foreign Application Priority Data

Aug. 7, 1999  (DE) ......................................... 199 37 495

(51) Int. Cl.[7] ................................................. G01M 1/00
(52) U.S. Cl. ..................................... 73/471; 73/862.01
(58) Field of Search .......................... 73/471, 460, 485, 73/486, 472, 862.01, 862.59, 862.045, 862.637

(56) References Cited

U.S. PATENT DOCUMENTS

| | | | |
|---|---|---|---|
| 3,785,210 A | * | 1/1974 | Muller ......................... 73/459 |
| 4,250,756 A | | 2/1981 | Maus |
| 4,640,138 A | * | 2/1987 | Meyer et al. .................. 73/483 |
| 4,691,567 A | | 9/1987 | Himmler et al. |
| 4,930,348 A | | 6/1990 | Bandhopadhyay et al. |
| 5,099,701 A | | 3/1992 | Wirth et al. |
| 5,677,487 A | | 10/1997 | Hansen |
| 5,784,929 A | | 7/1998 | Abraham et al. |

FOREIGN PATENT DOCUMENTS

| | | |
|---|---|---|
| DE | 2608891 | 9/1977 |
| DE | 2847295 | 5/1980 |
| DE | 2942379 | 4/1981 |
| DE | 3330974 | 3/1985 |
| GB | 1535108 | 12/1978 |

* cited by examiner

*Primary Examiner*—Hezron Williams
*Assistant Examiner*—Jacques M. Saint-Surin
(74) *Attorney, Agent, or Firm*—W. F. Fasse; W. G. Fasse

(57) ABSTRACT

An apparatus for determining the unbalance of a rotational body includes a central mounting plate with a mounting fixture on which the rotational body is received, an outer frame, and a plurality of supporting webs that connect the mounting plate to the frame. The webs are configured and arranged so that the mounting plate can pivotally vibrate about a pivot axis, and translationally vibrate in the plane of the mounting plate. A first vibration transducer measures the pivoting vibration and a second vibration transducer measures the translational vibration. The pivot axis remains in the central plane of the mounting plate which coincides with the effective plane of the translational vibration measuring transducer. In this manner, the translational vibration induced by a static unbalance, and the pivoting vibration induced by the moment unbalance are separated and then separately measured, which enables the accurate measurement of both the static unbalance component and the moment unbalance component of a dynamic unbalance. In a method using such an apparatus, all of the forces and moments originating from the rotational body are transmitted directly into and through the dynamometer element itself, without requiring any additional supporting elements.

41 Claims, 4 Drawing Sheets

METHOD AND APPARATUS FOR DETERMINING THE UNBALANCE OF A ROTATING BODY

PRIORITY CLAIM

This application is based on and claims the priority under 35 U.S.C. §119 of German Patent Application 199 37 495.3, filed on Aug. 7, 1999, the entire disclosure of which is incorporated herein by reference.

FIELD OF THE INVENTION

The invention relates to a method and an apparatus for determining the imbalance or unbalance of a rotating body that is mounted on a generally plate-shaped dynamometer element extending on a plane perpendicular to the rotation axis. The dynamometer element includes an inner mounting plate connected by webs to an outer frame, and at least one vibration transducer arranged between the plate and the frame for picking up unbalance induced vibrations of the mounting plate relative to the frame. The unbalance of the rotating body induces vibrations that can be detected separately as translational vibrations and pivotal vibrations.

BACKGROUND INFORMATION

German Patent Laying-Open Publication 28 47 295 discloses a balancing machine comprising a plate-shaped dynamometer element that is partially slitted or slotted in a spring-supportive manner and provided with connecting webs. The resulting structure of the dynamometer element includes an inner mounting plate comprising a mounting fixture for receiving the rotational body thereon, whereby this fixture may be embodied as a balancing spindle. The mounting plate is connected to the outer frame of the dynamometer element by respective webs arranged in the plane of the plate on both sides of the rotational axis of the rotational body. The vibrations arising during the rotation of the rotational body are transmitted by the mounting plate to vibration transformers or transducers. One of the transducers only detects or picks up the vibrational movements of the mounting plate about an axis, which correspond to the unbalance component arising as a result of an unbalance moment. On the other hand, the unbalance component arising from a single or individual force, namely a static unbalance, is detected or picked up by a further vibration transducer, of which the effective measuring direction extends parallel to the plane of the plate.

In the known apparatus, the dynamometer element is supported against a foundation, by two elastically flexible flat leaf springs as well as a further elastically flexible brace or support. The flat leaf springs for taking up and supporting forces in the direction of the rotation axis are secured to the mounting plate on both sides of the rotation axis of the rotational body, and respectively extend away from the surface of the plate at a right angle. The known apparatus includes separate elements in the form of elastically flexible supports or braces for taking up forces that are effective in the axial direct ion, such as axial thrust or weight forces for example. Such forces could influence the vibrating motions of the mounting plate and thereby correspondingly influence the accuracy of the unbalance determination in an undesirable manner.

SUMMARY OF THE INVENTION

In view of the above, it is an object of the invention to provide a rather simple and economical apparatus as well as a method for determining the unbalance of a rotational body, making it possible to achieve an unbalance measurement that is essentially free of interfering influences, and also to achieve an exact evaluation of the unbalance components respectively due to unbalance moments and static unbalances. It is a particular further object of the invention to improve especially the accuracy of determining the static unbalance component in such an unbalance measuring apparatus and method. The invention further aims to avoid or overcome the disadvantages of the prior art, and to achieve additional advantages, as are apparent from the present specification.

The above objects have been achieved according to the invention in an apparatus for determining the unbalance of a rotating body.

The apparatus comprises a generally plate-shaped dynamometer element that includes an inner mounting plate equipped with a mounting fixture on which the rotational body may be mounted, as well as an outer frame, and respective webs that interconnect the inner mounting plate and the outer frame. The apparatus further comprises at least one vibration transducer arranged between the mounting plate and the frame, where in this transducer is adapted to detect or pick-up the unbalance induced vibrations of the mounting plate relative to the frame. Particularly according to the invention, the pairs of webs that support the inner mounting plate relative to the outer frame are so embodied, configured and arranged so as to support or brace the mounting plate with respect to forces that are not induced by an unbalance, while simultaneously allowing the mounting plate to oscillate or vibrate.

Throughout this specification, the term "plate-shaped" is intended to define a shape that generally extends along a plane, i.e. having lateral dimensions in the plane that are significantly greater than the thickness or height dimension perpendicular to the plane. The plate plane is understood to be a plane parallel to the major surface of the plate-shaped element, and particularly of the mounting plate, for example.

According to a further embodiment of the invention, the apparatus includes not only one, but two vibration transducers arranged between the mounting plate and the frame, in order to separately detect or pick-up translational vibrations of the mounting plate relative to the frame in the plane of the plate, and pivotal vibrations of the mounting plate relative to the frame in a pivoting direction about a pivot axis of the plate that extends perpendicular to the rotation axis of the rotational body.

In the apparatus according to the invention, the plate-shaped dynamometer element receives or takes up all of the forces and moments that originate or are emitted from the rotational body, so that separate or additional supports and braces for the rotational body and for the mounting plate may advantageously be omitted. In the simplest manner, by embodying the pairs of supporting webs so that they not only support the axial thrust or weight forces, but also provide the vibrational or oscillating support of the mounting plate, it is possible to achieve an apparatus with an especially compact construction and particularly a low structural height. Moreover, the inventive apparatus has an essentially symmetrical construction with respect to the stiffness distribution as well as the mass distribution, and further achieves a very exact unbalance determination due to the improved plane separation.

The generally plate-shaped dynamometer element according to the invention may be fabricated in an especially economical manner, for example as an integral sheet metal part that is burned or cut out of a sheet metal plate and then formed as necessary, or as an integral cast part. The structure of the dynamometer element according to the invention makes it possible to achieve a very small spacing distance between the center of mass of the rotor and the reference plane of the dynamometer element. Ultimately, that leads to a more exact measurement result due to the improved separation of planes. The determination of the static unbalance is achieved very accurately, since the structure is essentially symmetrical and the measuring plane of the vibration transducer lies in the plane of the plate of the dynamometer element. The embodiment of the invention with only one vibration transducer is particularly advantageous for carrying out single plane unbalance measurements, and represents the simplest inventive structure.

In a particular embodiment according to the invention, a first pair of supporting webs is arranged in the plate plane and in a plane containing or including the rotation axis and the pivot axis. In this manner, the pivot axis for the pivotal vibrations of the dynamometer element is optimally positioned. The pivot axis formed by this pair of webs lies in the plate plane so that no interfering forces or moments can influence the measurement result. This pair of webs is embodied to be flexurally stiff with respect to bending perpendicular to the plate plane, so that these webs are adapted in a simple manner to support the forces that are not induced by an unbalance, such as the weight force or the forces that arise in the axial direction or thrust direction of the rotational body, for example due to the configuration of the rotational body as a rotor including axial force generating elements such as rotor blades. For this purpose, the webs of this web pair are constructed or embodied so as to have a high polar or area moment of inertia about the transverse axis, for example as is the case for a rectangular sectional profile member or by two rods or struts that are spaced apart from each other to form a single web comprising these rods or struts.

According to another embodiment of the invention, two further pairs of webs extending parallel to each other can be provided to both sides of the first web pair forming the pivot axis. This arrangement provides a symmetrical configuration that is especially advantageous with regard to the design, the fabrication and assembly, the calibration, and the measurement accuracy. This is also true for a further detail of the invention, in which the mounting plate is embodied with a rectangular shape, and the web pairs are respectively arranged at the ends as well as in the middle of the longer sides or edges of the rectangle.

In order to arrange the vibration transducer between the mounting plate and the frame, various configurations are possible. According to one possibility, the mounting plate comprises an extension arm protruding therefrom while the frame includes a recessed portion, and the vibration transducer adapted to detect the pivoting vibration is supported and arranged between the end of the extension arm of the mounting plate and the recessed portion of the frame. This construction achieves a very compact dynamometer element that is able to carry out a very exact measurement.

The invention provides very simple measures for arranging the plate plane of the dynamometer element alternatively in the horizontal direction or the vertical direction. Thus, the inventive dynamometer element may be used in balancing machines that are adapted to special requirements, with vertical or horizontal rotation axes, in a very simple manner.

If the rotation axis is oriented in the vertical direction, whereby the plate plane extends in the horizontal plane, this advantageously provides a free space below the dynamometer element that is free and clear of separate supporting elements. Thus, the resulting free space beneath the dynamometer element can easily be used to accommodate other elements of a balancing machine or an unbalance measuring machine, for example the drive and control arrangements or clamping devices for securing the rotational body onto a balancing spindle or onto the mounting surfaces of the mounting plate. Overall, this leads to a compact, user-friendly, and service-friendly construction.

The above stated objects have further been achieved according to the invention in a method for determining the unbalance of a rotational body, using a plate-shaped dynamometer element including a mounting fixture for receiving the rotational body. According to the inventive method, the unbalance induced vibrations of portions of the dynamometer element are separately detectable or can be picked-up as translational vibrations and as pivotal vibrations. Further, particularly according to the invention, all of the forces and moments originating and emanating from the rotational body are transmitted into and through the dynamometer element. As mentioned above, this avoids the need for additional separate supports.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
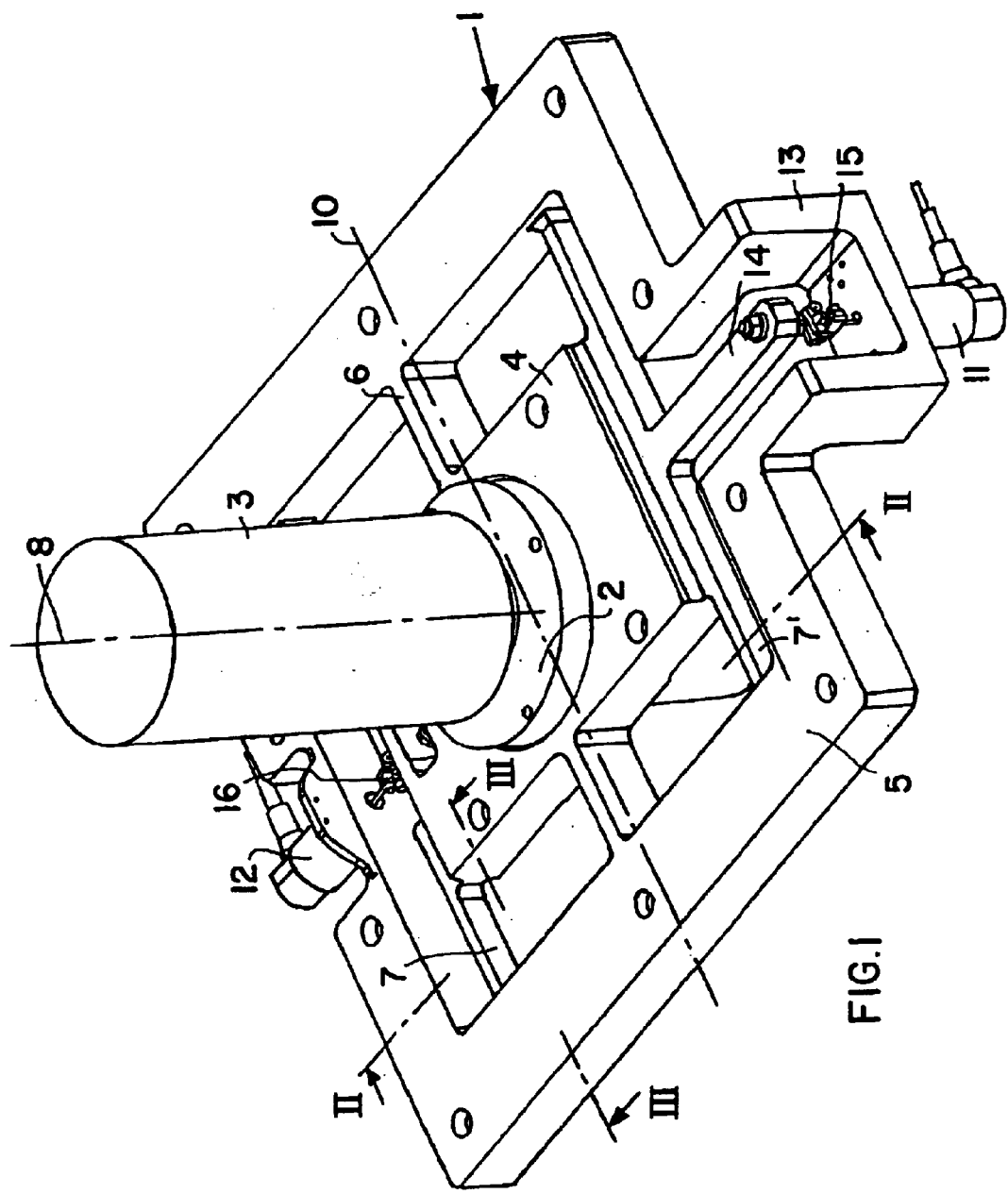
FIG. 1 is a schematic perspective overview of a dynamometer element according to the invention.

As shown in FIG. 1, the dynamometer element 1 of a balancing machine (which is not shown overall) comprises an inner mounting plate 4 and an outer frame 5, which are connected to each other by web pairs 6, 7, and 7'. The mounting plate 4 includes a mounting fixture 2 adapted to receive a rotational body 3 thereon, whereby this rotational body is to be rotated about a rotation axis 8, in order to measure the unbalance of the rotational body 3 using the dynamometer element 1. The terms "dynamometer" and "dynamometer element" as used herein refer to a spring-suspended supporting and measuring system as generally understood in the field of balancing technology.

The mounting fixture 2 is received in a bore in the mounting plate 4, and may comprise a plurality of mounting surfaces on which the rotational body 3 is secured, as shown in the illustrated example. Alternatively, or further, the mounting fixture 2 may comprise a balancing spindle, for example, on which the rotational body 3 that is to be tested can be mounted. The mounting fixture 2 is rotationally driven in a typical manner, for example by a belt drive arrangement or by a flange-connected motor. In any event, the drive arrangement may be located below the mounting plate 4, and the mounting fixture 2 is supported by rotational bearings or the like to allow the mounting fixture 2 to rotate about the rotation axis 8 relative to the mounting plate 4. The overall dynamometer element 1 is secured via the outer frame 5 in the balancing machine.

The dynamometer element 1 further includes two vibration transducers 11 and 12, which provide signals to an unbalance measuring arrangement for determining the required degree of balancing compensation measures in two balancing or compensating planes, in terms of the magnitude as well as the angular position of the respective compensation that is required. The angular position is determined further in connection with the signals of a reference angle transducer, which is not shown, but which provides the instantaneous rotational or angular position of the rotational body 3 in any known manner. The vibration transducers may also comprise any conventionally known transducers for detecting a vibration, for example electrodynamic velocity transducers or piezoelectric transducers that respectively convert a mechanical vibration into a corresponding electrical signal.

All of the forces and moments originating from the rotational body 3 as it rotates are transferred into the mounting plate 4 through the mounting fixture 2. As a result, any unbalance of the rotational body 3 will cause corresponding vibrations of the mounting plate 4. The unbalance induced vibrations of the mounting plate 4 are transformed or separated into translational vibrations and pivotal or rotational vibrations. This transformation and separation of the vibrations is achieved in that the rotational axis 8 of the rotational body 3, which extends generally perpendicularly relative to the plate plane of the mounting plate 4, is oriented to be tiltable or pivotable about a pivot axis 10 that lies in the center plane of the plate-shaped dynamometer element 1. This pivotability of the mounting plate 4 about the pivot axis 10 is achieved by its support and mounting via the webs 6, 7 and 7' as will be explained in detail below. The pivot axis 10 intersects the rotation axis 8 at a right angle, and in the illustrated example extends perpendicularly to the direction in which the unbalance induced translational vibrations are detected. However, it is alternatively possible to arrange the direction for detecting the translational vibrations along or parallel to the direction of the pivot axis 10 itself. The particular arrangement of the vibration transducers 11 and 12 will be described in detail below, but in general the transducer 11 is arranged to detect the pivotal vibrations while the transducer 12 is arranged to detect the translational vibrations.

The unbalance induced pivotal vibrations, which are resolved as pivotal vibrations about the pivot axis 10, result from the unbalance moment of the rotational body 3 being tested. On the other hand, the unbalance induced translational vibrations, which are resolved as translational vibrations of the mounting plate 4 in the plane of the plate lying perpendicular to the rotational axis 8, are caused by the static unbalance of the rotational body 3. When only a balancing or unbalance measuring in a single plane is to be carried out, only the signal of the vibration transducer 12 which detects the translational vibrations is necessary for the measurement. Thus, in such a case, the vibration transducer 11 that detects the pivotal vibrations can be omitted in a single plane balancing machine.

The arrangement and configuration of the web pairs 6, 7 and 7' ensures that the unbalance induced translational and pivotal behavior of the mounting plate 4 relative to the outer frame 5 will be essentially without other external influences. In order to achieve this, one web pair 6 is arranged in or along the pivot axis 10 about which the pivoting motion of the mounting plate 4 takes place, and two web pairs 7 and 7' are respectively arranged equidistant from the pivot axis 10 at the ends of the long sides of the mounting plate 4, which has a rectangular plan view shape in the present example. All of the webs extend parallel to each other and parallel to the pivot axis 10.

Due to the arrangement of the web pair 6 directly along the pivot axis 10, the unbalance induced rotational or pivoting motion of the mounting plate 4 is practically not influenced by these webs 6, because no interfering moment can arise. On the other hand, the arrangement of the second web pairs 7 and 7' cooperates with the first web pair 6 to form respective parallel linkages or parallel rod arrangements (as seen in a top plan view, for example), for allowing vibrations of the mounting plate 4 in a direction lying perpendicular to the pivot axis 10 in the plane of the plate. These two outer web pairs 7 and 7' are flexurally soft, i.e. readily yield to flexible bending, with respect to flexible bending out of the plate plane due to the pivoting vibrations of the mounting plate 4 about the pivot axis 10, and with respect to the flexible bending in the plate plane due to the parallel linkage configuration and function thereof.

In comparison, the web pair 6 running directly along the pivot axis 10 is flexurally soft or easily flexible with respect to its parallel linkage function in the plate plane, but flexurally stiff with respect to bending out of the plate plane. This particular flexural stiffness of the web pair 6 makes it possible to support and transmit all forces, namely not only the unbalance induced forces, but also the rotor specific axial forces such as thrust forces generated by the rotation of a rotor equipped with vanes representing the rotational body 3, or simply gravitationally induced weight forces in the dynamometer element 1 itself, without requiring any additional supporting or bracing elements.

Figure 2:
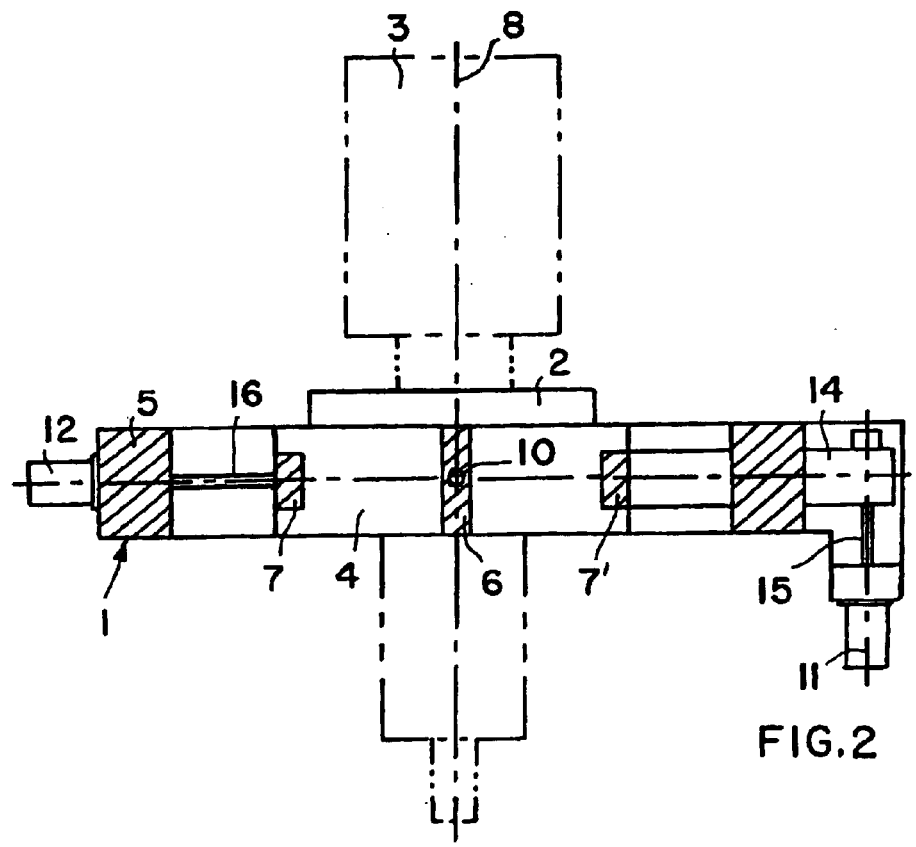
FIG. 2 is a cross-section of the dynamometer element, taken along the line II—II in FIG. 1.

As a result of the above described stiffness and flexibility characteristics of the respective webs 6, 7 and 7', the mounting plate 4 is able to vibrate pivotally or rotationally about the pivot axis 10, and also translationally in a direction perpendicular to the rotation axis 8 and perpendicular to the pivot axis 10, i.e. in a back-and-forth direction parallel to the lengthwise direction of the rectangular mounting plate 4. It is this lengthwise back-and-forth translational vibration of the mounting plate 4 that is enabled by the parallel linkage function of the laterally flexible webs 6, 7, and 7'. The different flexibilities of the respective webs in different planes is achieved by proper dimensioning and configuration of the webs, as will be described in greater detail below. In general, with reference to FIGS. 1 and 2, the central webs 6 have a greater height or thickness in a direction perpendicular to the plane of the mounting plate to provide stiffness against bending in this direction, while the webs 7 and 7' are thinner in this direction so as to in allow the pivoting vibration of the mounting plate 4.

The vibration transducer 11 is provided for detecting the rotational or pivoting vibrations of the mounting plate 4 about the pivoting axis 10. In the present illustrated example, the vibration transducer 11 is embodied as a moving coil transducer of which the sensitive axis or measuring axis extends parallel to the rotation axis 8 of the rotational body 3. Other conventionally known types of vibration transducers and arrangements thereof are possible, as long as this transducer is adapted to measure the pivoting vibrations of the mounting plate 4 about the pivoting axis 10. In the present example embodiment, the vibration transducer 11 is secured to a recess frame extension or protrusion 13 that protrudes integrally from the outer frame 5. A plate extension or arm 14 protruding integrally from the mounting plate 4 reaches into the recess space or open yoke defined within the frame extension 13. The plate extension arm 14 thus vibrates together with the mounting plate 4, and is free to move within the recess space defined by the frame extension 13. An elastically flexible coupling rod 15 is connected to the end of the plate extension arm 14, such that the unbalance induced pivoting vibrations of the mounting plate 4 are transmitted via the plate extension arm 14 to the coupling rod 15, which in turn transmits these movements into the vibration transducer 11. The movement of the coupling rod 15 relative to the transducer 11, and particularly substantially up and down parallel to the rotation axis 8 in the illustrated embodiment of FIG. 1, is electromagnetically detected by the transducer 11, which responsively generates a corresponding electrical signal.

As an alternative to the arrangement of FIG. 1, the plate extension arm may include a vertical offset while the frame extends substantially entirely along the single plane of the dynamometer element, or both components can have an offset in the vertical direction. Basically, any configuration that allows the coupling of the pivoting vibration of the mounting plate 4 into the transducer 11 can be effectively used in the inventive construction.

The other vibration transducer 12 is arranged so that its measuring axis is oriented for detecting the translational vibration movements of the mounting plate 4 in the plane of the plate. For this purpose, the measuring axis of the transducer 12 is oriented perpendicularly relative to the axes of the webs 6, 7, 7', and perpendicularly to the rotation axis 8 of the rotational body 3. Moreover, the measuring axis of the transducer 12 lies in the central plane of the plate-shaped dynamometer 1. In the illustrated embodiment, the vibration transducer 12 is arranged in a cut-out or recess of the outer perimeter of the outer frame 5, and an elastically flexible coupling rod 16 connected to the narrow end of the mounting plate 4 functionally cooperates with the transducer 12. In this manner, the translational vibrations of the mounting plate 4 along the axis of the coupling rod 16 are coupled into the transducer 12, while the pivotal vibrations of the mounting plate 4 do not have a significant influence on the transducer 12 due to the lateral flexibility of the coupling rod 16. Similar considerations apply to the flexible coupling rod 15 interacting with the transducer 11.

In another embodiment, which is not illustrated in detail, at least one of the two vibration transducers 11 and 12 may be slidingly adjusted in a direction parallel to its axis, and the transducer may be secured in the appropriate adjusted position. For example, the vibration transducer 12 may be adjusted in such a manner by simply sliding the transducer with its flange surface along the corresponding associated frame surface forming the floor of the recess on the outer perimeter of the frame 5, or by sliding along a receiving bore or the like, before securing the transducer at the proper position. In this manner, phase errors of the two transducer signals relative to each other, which might arise due to material anisotropies or fabrication non-symmetries, may be mechanically compensated and cancelled out in a simple manner.

As a further alternative, piezoelectric transducers can be arranged directly between the mounting plate 4 and the frame 5. Such an arrangement provides a greater degree of geometrical symmetry of the overall arrangement. Furthermore, respective transducers for detecting the pivoting vibrational movements can be arranged on both sides of the pivot axis 10, which further improves the degree of symmetry with regard to the measurement.

Figure 3:
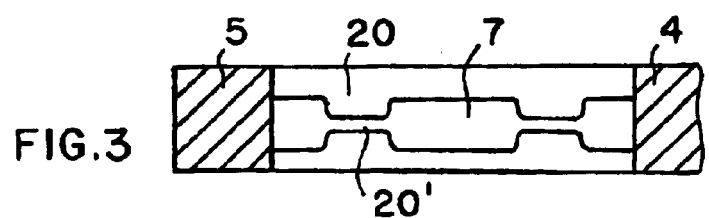
FIG. 3 is a cross-section of a portion of the dynamometer element taken along the line III—III in FIG. 1, but showing a special embodiment detail.

FIG. 3 shows a section through a portion of the dynamometer element 1 according to FIG. 1. Particularly, FIG. 3 shows a special configuration of one of the outer webs 7, which will be matched by the configuration of the other outer webs 7'. In order to adjust the pivoting stiffness of the pivoting motion of the mounting plate 4 about the pivoting axis 10, each web of the web pairs 7 and 7' may have cut-outs, recesses, or notches 20 formed therein in order to form hinges 20' in the webs and to thereby influence the bending stiffness of the webs 7 and 7', which ultimately influences the pivoting stiffness of the mounting plate 4 about the pivoting axis 10. Throughout this specification, the term "notch" refers to any notch, groove, recess, cut-out, or taper that forms a narrower neck or hinge area in the respective web. It should be noted that FIG. 1 shows an embodiment without such notches or cut-outs in the webs 7 and 7', so FIG. 3 represents a further variant in comparison to FIG. 1.

Figure 4:
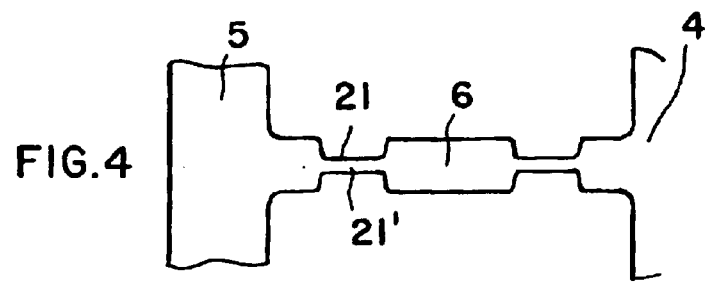
FIG. 4 is a top plan view of a portion of the dynamometer element including a single support web with a special configuration.

FIG. 4 is a top plan view of an alternative or variant of the webs 6 extending along the translation axis 10. In order to make these webs 6 more flexible in the plane of the mounting plate 4 so as to adjust the stiffness or movability of the mounting plate 4 with respect to the translational vibrations, the web 6 may be provided with similar notches, cut-outs or recesses 21 in the side surfaces thereof (rather than the top surfaces as in the webs 7 and 7' described above), so as to form narrower hinge portions 21' in the webs 6 at areas between the respective notches or cut-outs 21. Thus, the notches or cut-outs 21 are provided on surfaces of the webs 6 that are rotated or offset by 90° relative to the notches or cut-outs 20 provided in the webs 7. By appropriately providing such notches, in combination with the vertical and lateral dimensions of the respective webs, further in consideration of the inherent material stiffness of the material making up the webs, both the pivoting stiffness and the translational stiffness behavior of the dynamometer element 1 can be readily adjusted to specific requirements.

Figure 5:
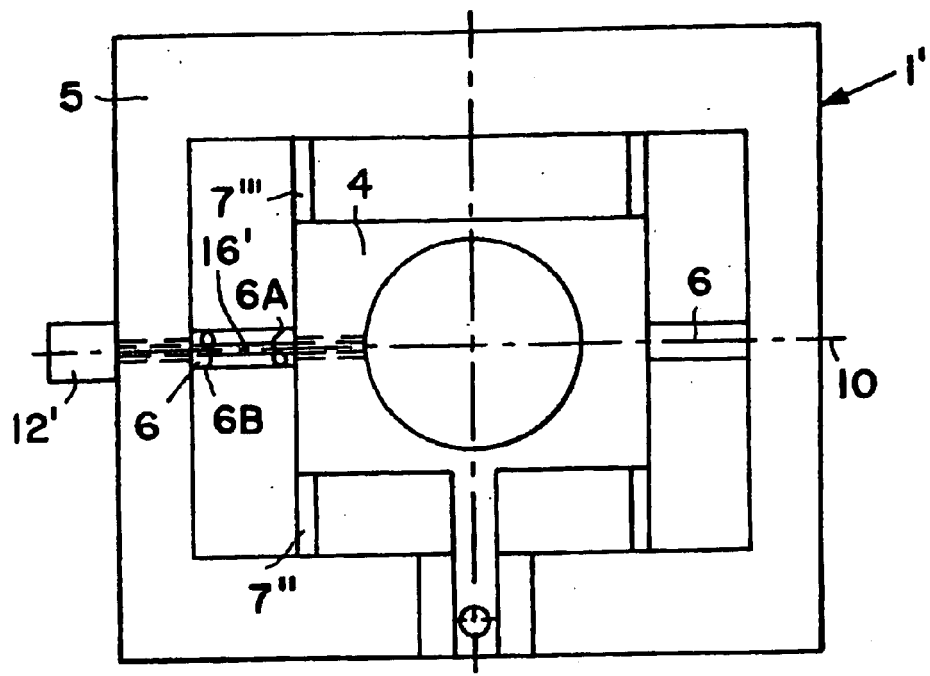
FIG. 5 is a schematic top plan view of a further embodiment of a dynamometer element according to the invention.

FIG. 5 is a top plan view of a varied dynamometer element 1' in which the direction for detecting the translational vibrations and the direction of the pivoting axis 10 coincide with one another. Each individual web of the web pair 6 in this embodiment is, for example, formed of two individual bars or rods respectively per pair of webs, whereby these rods or bars are arranged vertically spaced apart one above the other. The coupling rod 16' extending between the mounting plate 4 and the vibration transducer 12' is arranged between the two rods 6A and 6B making up the respective web 6, so that the coupling rod 16' lies in the center plane of the dynamometer element 1'. The vibrational support of the mounting plate 4 with respect to the translational vibration motion is achieved by means of the web pairs 7" and 7''' respectively arranged at the ends or corners of the longer sides of the rectangular mounting plate 4. Thus, the translational vibration is effective in a direction parallel to the pivot axis 10.

Figure 6:
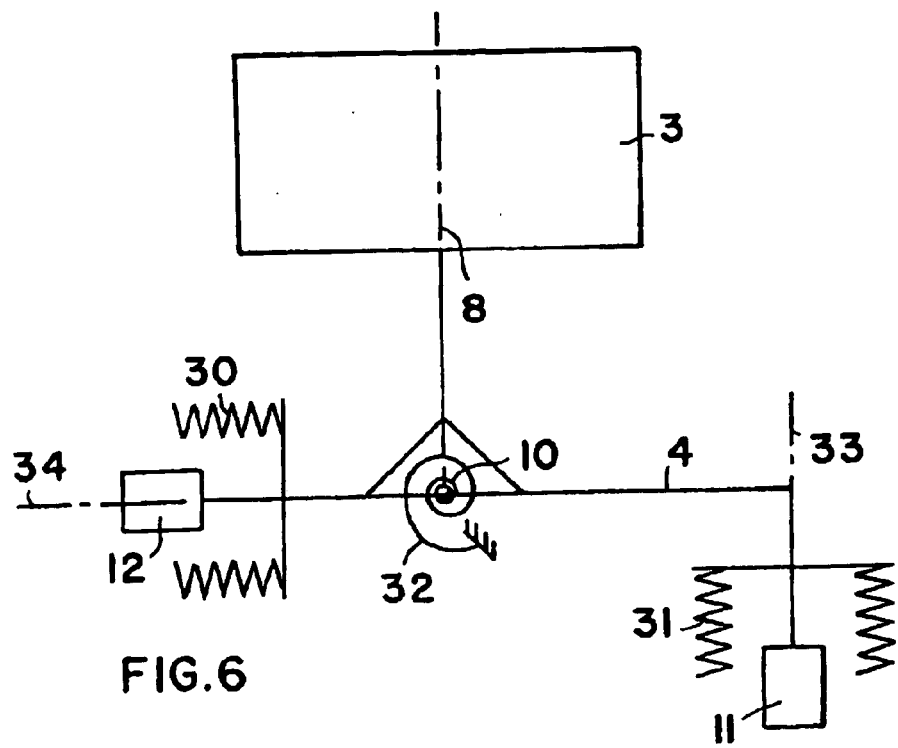
FIG. 6 is a schematic block diagram illustrating the principle components of the apparatus according to the invention.

FIG. 6 schematically represents the principle construction and operation of the apparatus according to the present invention. In this embodiment, the rotation axis 8 of the rotational body 3 is oriented substantially vertically, while the pivot axis 10 about which the rotational body 3 is pivotably supported extends horizontally. The rotation axis 8 and the mounting plate 4 may be schematically represented by a two-armed lever arrangement including two lever arms that extend perpendicularly relative to each other. The dynamometer system has a horizontal stiffness that is schematically represented by the horizontal spring symbol 30, a vertical stiffness schematically indicated by the vertical spring symbol 31, and a rotational or pivoting torsional stiffness about the pivoting axis 10 schematically represented by the torsional spring symbol 32. The dash-dotted line 33 indicates the vertical effective plane of the vibration transducer 11 for the vibrational movements that are effective along the vertical plane (i.e. the pivoting vibrations of the mounting plate 4 about the pivot axis 10), while the dash-dotted line 34 indicates the horizontal effective plane of the vibration transducer 12 for the vibrations acting in the horizontal direction, i.e. the translational vibrations of the mounting plate 4.

When carrying out a single plane measurement, i.e. for determining only a static unbalance, the horizontal vibration transducer 12 will measure the vibrational displacement in the horizontal direction resulting from the static unbalance. The pivot axis 10 thereby remains in the horizontal effective plane 34 of the horizontal vibration transducer 12, i.e. in the center plane of the plate-shaped dynamometer. Only the horizontal translational vibrations are of significance and are measured.

When carrying out a two plane measurement or two axis measurement, i.e. when measuring a dynamic unbalance, which can be considered as the superposition of a static unbalance and a moment induced unbalance, the horizontal vibration transducer 12 will measure the vibration displacement in the horizontal direction due to the static unbalance, while the vertical vibration transducer 11 will measure the vibrational displacement in the vertical direction that arises due to the pivoting movement of the two-armed angled lever arrangement of the components 8 and 4 due to the moment induced unbalance. The pivot axis 10 thereby also remains in the horizontal effective plane 34 of the vibration transducer 12. It is apparent that the pivot axis 10 always remains in the horizontal effective plane 34 of the transducer 12.

As a comparison to the inventive system, a non-inventive system that is subject to interfering influences, for example due to the use of additional supporting members, has only a small or diminished degree of symmetry in comparison to the inventive system, with respect to the mass distribution and the stiffness distribution. As a result, in such a non-inventive system, the pivoting axis 10 no longer lies in the horizontal effective plane of the horizontal vibration transducer 12, but rather is positioned out of this plane, which leads to the measurement of, for example, too large vibrational displacements.

The invention for the first time ensures that the pivot axis, or in general the reference plane of the plate-shaped dynamometer element 11 will remain in the horizontal effective plane 34 of the horizontal vibration transducer 12. In this manner, an ideal separation and discrimination between a vibrational movement induced by a dynamic unbalance and a vibrational movement induced by a static unbalance becomes possible. Thereby, an exact determination of the static unbalance can be achieved.

Figure 7:
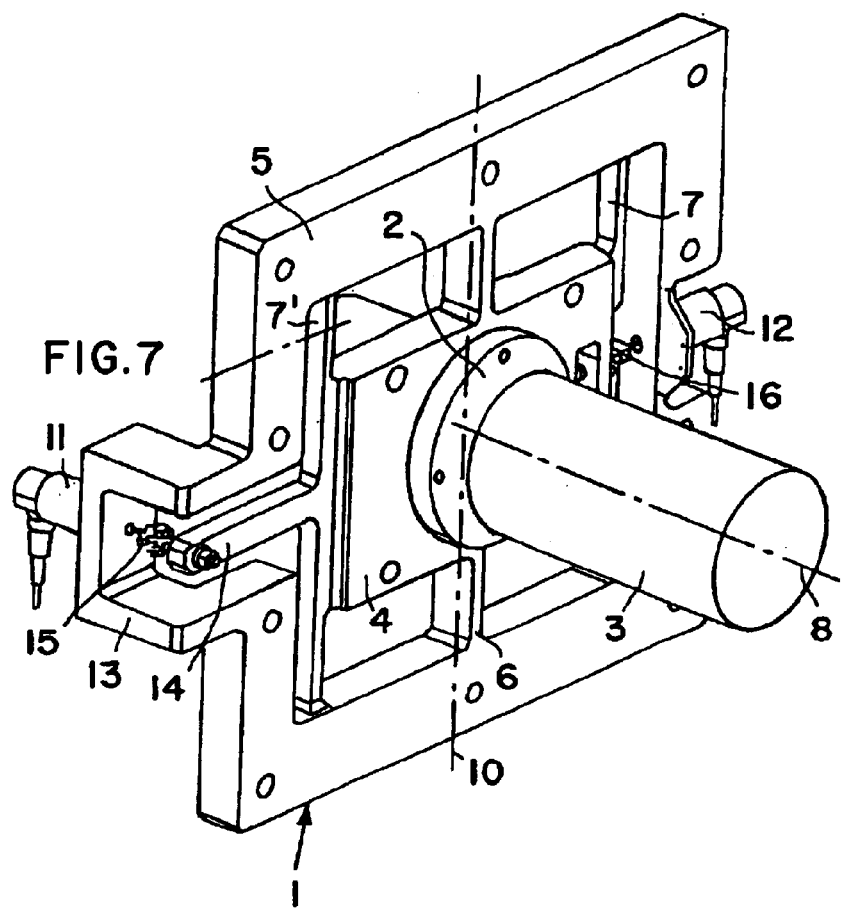
FIG. 7 is a view similar to that of FIG. 1, but showing an embodiment with the rotation axis horizontally oriented and the plate plane vertically oriented.

FIG. 7 shows a further variant, which corresponds with the embodiment shown in FIG. 1, except that in FIG. 7, the entire dynamometer element has been tilted so that the plate plane extends vertically and the rotation axis extends horizontally. This arrangement demonstrates that the present dynamometer element is versatile and can be adapted for use in a variety of different unbalance measuring machines and balancing machines.

Figure 8:
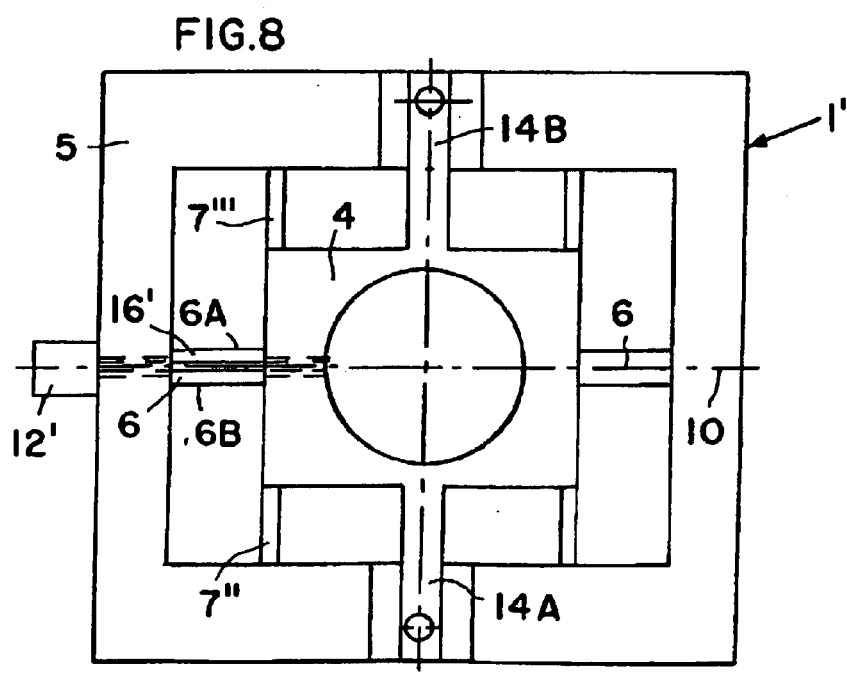
FIG. 8 is top plan view similar to that of FIG. 5, but showing a further varied embodiment.

FIG. 8 shows a variant of the embodiment of FIG. 5, wherein the plate 4 includes not only one, but two opposed plate extension arms 14A and 14B on opposite sides of the pivot axis. These two extension arms cooperate with two respective vibration transducers similar to the arrangement of the transducer 11 described above.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims. In this specification, terms such as "substantially perpendicular" or the like, refer to an orientation that is generally perpendicular or the like, except allows for an angular range of variation around perfect perpendicularity due to the vibration, e.g. the pivotal vibration, of the mounting plate. For example, the rotation axis can be said to be oriented substantially vertically, because it will vary in an angular range around the true vertical as the mounting plate vibrates pivotally.

What is claimed is:

1. An apparatus for determining an unbalance of a rotational body when said rotational body is mounted on said apparatus so as to be rotatable about a rotation axis, said apparatus comprising:

a mounting plate extending along and defining a plate plane;

a mounting fixture that is arranged on said mounting plate, and that is adapted to receive the rotational body mounted thereon so as to allow the rotational body to rotate about said rotation axis, wherein said rotation axis is oriented perpendicular to said plate plane;

an outer frame arranged at least partially outwardly around said mounting plate;

plural pairs of webs on said plate plane, said webs respectively connecting said mounting plate to said outer frame in an arrangement of said webs that is symmetrical relative to said rotation axis, wherein said webs are so configured and arranged so as to support said mounting plate relative to said outer frame, to transmit from said mounting plate to said outer frame all axially directed forces that are oriented along said rotation axis and that are not induced by the unbalance of the rotational body, and to allow said mounting plate to undergo translational vibration relative to said outer frame in said plate plane, wherein said translational vibration is induced in said mounting plate by the unbalance of the rotational body; and a first vibration transducer arrangement that is coupled to said outer frame and to said mounting plate, and that is so arranged and adapted to detect said translational vibration of said mounting plate relative to said outer frame in said plate plane.

2. The apparatus according to claim 1, wherein said webs are further so configured and arranged so as to define a pivot axis perpendicular to said rotation axis, and so as to allow said mounting plate to undergo pivotal vibration relative to said outer frame about said pivot axis, wherein said pivotal vibration is induced in said mounting plate by the unbalance of the rotational body.

3. The apparatus according to claim 2, further comprising a second vibration transducer arrangement that is coupled to said outer frame and to said mounting plate, and that is so arranged and adapted to detect said pivotal vibration of said mounting plate relative to said outer frame about said pivot axis.

4. The apparatus according to claim 3, wherein said first vibration transducer arrangement has a first effective measuring axis that is oriented always perpendicular to said pivot axis and substantially perpendicular to said rotation axis, and said second vibration transducer arrangement has a second effective measuring axis that is oriented substantially perpendicular to said plate plane at a location offset from said pivot axis.

5. The apparatus according to claim 3, wherein said first vibration transducer arrangement has a first effective measuring axis that is oriented coincident with said pivot axis, and said second vibration transducer arrangement has a second effective measuring axis that is oriented substantially perpendicular to said plate plane at a location offset from said pivot axis.

6. The apparatus according to claim 3, wherein said mounting plate comprises a plate body on which said mounting fixture is arranged and an extension arm protruding outwardly from said plate body, said outer frame comprises a plurality of frame members arranged outwardly around said mounting plate and a frame protrusion that protrudes from at least one of said frame members away from said plate plane and that defines a clearance space therein, a free end of said extension arm extends into said clearance space, and said second vibration transducer arrangement is coupled to said free end of said extension arm and to said frame protrusion in said clearance space.

7. The apparatus according to claim 3, wherein each one of said vibration transducer arrangements respectively comprises a vibration transducer connected to said outer frame, and an elastically flexibly bendable coupling rod that is connected to said mounting plate and cooperates with said transducer to couple said transducer to said mounting plate.

8. The apparatus according to claim 3, wherein at least one of said vibration transducer arrangements has a respective effective measuring axis, and is adjustably secured to at least one of said outer frame and said mounting plate so as to be slidably adjustable and selectively fixable in a direction parallel to said effective measuring axis.

9. The apparatus according to claim 3, further comprising a third vibration transducer arrangement that is coupled to said outer frame and to said mounting plate, and that is so arranged and adapted to detect said pivotal vibration of said mounting plate relative to said outer frame about said pivot axis, wherein said second and third vibration transducer arrangements are respectively located spaced away from said pivot axis on two opposite sides of said pivot axis.

10. The apparatus according to claim 3, wherein said second vibration transducer arrangement has a second effective measuring axis that is oriented substantially parallel to said rotation axis and substantially perpendicular to said plate plane.

11. The apparatus according to claim 3, wherein said first and second vibration transducer arrangements are both coupled directly to said outer frame and directly to said mounting plate.

12. The apparatus according to claim 3, wherein said first and second vibration transducer arrangements respectively have first and second effective measuring axes that are oriented perpendicular relative to each other.

13. The apparatus according to claim 3, wherein said first vibration transducer arrangement is arranged and oriented to detect only said translational vibration without being sensitive to said pivotal vibration, and said second vibration transducer arrangement is arranged and oriented to detect only said pivotal vibration without being sensitive to said translational vibration.

14. The apparatus according to claim 2, wherein said pivot axis always lies in said plate plane.

15. The apparatus according to claim 2, wherein said webs include a first pair of webs that extend along and parallel to said pivot axis respectively on opposite sides of said mounting plate and that define said pivot axis, said webs further include a second pair of webs and a third pair of webs that respectively extend parallel to each other and parallel to said first pair of webs in said plate plane, and said second pair of webs and said third pair of webs are located respectively spaced equidistantly from said pivot axis on opposite sides of said pivot axis.

16. The apparatus according to claim 15, wherein said webs of said second and third pairs of webs each respectively comprise a flexible sectional bar member having a square, rectangular, polygon or circular cross-sectional shape.

17. The apparatus according to claim 15, wherein said webs of said second and third pairs of webs each respectively have at least one notch therein positioned so as to increase a flexibility of each respective said web in a direction perpendicular to said plate plane.

18. The apparatus according to claim 2, wherein:
said webs include first, second and third pairs of webs;
said webs of each said pair are arranged axially aligned with each other respectively on opposite sides of said mounting plate;
said webs of said first pair of webs extend along and parallel to said pivot axis to define said pivot axis;
said webs of said first pair of webs are relatively more flexible with respect to torsion about said pivot axis so as to allow said pivotal vibration of said mounting plate and with respect to bending in said plate plane so as to allow said translational vibration of said mounting plate, and are relatively less flexible with respect to bending perpendicular to said plate plane so as to support and transmit said forces from said mounting plate to said outer frame;
said webs of said second and third pairs of webs are flexible with respect to bending in said plate plane so as to allow said translational vibration of said mounting plate and with respect to bending perpendicular to said plate plane so as to allow said pivotal vibration of said mounting plate; and
said webs of said first pair are stiffer than said webs of said second and third pairs with respect to bending perpendicular to said plate plane.

19. The apparatus according to claim 2, wherein said webs include a first pair of webs that extend along and parallel to said pivot axis respectively on respective opposite sides of said mounting plate, and second and third pairs of webs that extend perpendicular to said pivot axis on respective opposite sides of said mounting plate.

20. The apparatus according to claim 1, wherein said mounting plate has a rectangular plan shape including two long sides and two short sides meeting each other at respective ends, and said webs include a first pair of webs arranged at a center of said long sides, and second and third pairs of webs arranged at said ends of said long sides.

21. The apparatus according to claim 1, wherein at least one of said webs has at least one notch therein positioned so as to increase a flexibility of said web with respect to bending in said plate plane.

22. The apparatus according to claim 1, wherein said rotation axis is oriented substantially vertically, and said plate plane is oriented substantially horizontally.

23. The apparatus according to claim 1, wherein said rotation axis is oriented substantially horizontally, and said plate plane is oriented substantially vertically.

24. The apparatus according to claim 1, wherein said webs include a first pair of webs that extend along an intersection of said plate plane and a plane containing said rotation axis.

25. The apparatus according to claim 24, wherein said webs of said first pair each respectively have a cross-sectional shape that is flexurally stiff in a direction so as to resist bending due to said forces that are oriented along said rotation axis and are not induced by the unbalance of the rotational body.

26. The apparatus according to claim 25, wherein said cross-sectional shape is a rectangular cross-sectional shape having longer rectangle sides oriented perpendicular to said plate plane.

27. The apparatus according to claim 1, wherein said mounting plate is connected and supported relative to said outer frame only by said webs, and expressly excluding all additional supports for said mounting plate and for the rotational body.

28. The apparatus according to claim 1, wherein said mounting plate, said webs and said outer frame are integrally formed with one another so as to form thereof a single integral component.

29. The apparatus according to claim 1, wherein each one of said vibration transducer arrangements respectively comprises a vibration transducer connected to said outer frame, and an elastically flexibly bendable coupling rod that is connected to said mounting plate and cooperates with said transducer to couple said transducer to said mounting plate.

30. The apparatus according to claim 1, wherein said apparatus includes only a single one of said mounting plate, and said plural pairs of webs on said plate plane provide the only and entire support of said mounting plate.

31. The apparatus according to claim 1, wherein all of said pairs of webs are parallel to each other on said plate plane.

32. The apparatus according to claim 1, wherein said pairs of webs include one pair of said webs that is oriented perpendicular to another pair of said webs on said plate plane.

33. The apparatus according to claim 1, wherein said first vibration transducer arrangement has a first effective measuring axis that lies in the same plane as all of said plural pairs of webs.

34. A method of determining an unbalance of a rotational body, comprising the following steps:
   a) mounting said rotational body on a mounting fixture of a dynamometer element;
   b) rotating said rotational body mounted on said fixture about a rotational axis;
   c) transferring all forces and moments originating from said rotational body into and through said dynamometer element, thereby causing at least a portion of said dynamometer element to undergo at least one of translational vibration in a plane of said dynamometer element and pivotal vibration about a pivot axis; and
   d) separately detecting a first one of said pivotal vibration and said translational vibration separately from a second other one of said vibrations using only a first sensor that is sensitive to only said first one of said vibrations without being sensitive to said second other one of said vibrations.

35. The method according to claim 34, further comprising, simultaneously during said step d), separately detecting said second other one of said vibrations separately from said first one of said vibrations using only a second sensor that is sensitive to only said second other one of said vibrations without being sensitive to said first one of said vibrations.

36. An apparatus for determining an unbalance of a rotational body when said rotational body is mounted on said apparatus so as to be rotatable about a rotation axis, said apparatus comprising:
   a mounting plate extending along and defining a plate plane;
   a mounting fixture that is arranged on said mounting plate, and that is adapted to receive the rotational body mounted thereon so as to allow the rotational body to rotate about said rotation axis, wherein said rotation axis is oriented perpendicular to said plate plane;
   an outer frame arranged at least partially outwardly around said mounting plate;
   a plurality of webs respectively connecting said mounting plate to said outer frame, wherein said webs are so configured and arranged so as to support said mounting plate relative to said outer frame, to transmit from said mounting plate to said outer frame forces that are oriented along said rotation axis and that are not induced by the unbalance of the rotational body, to allow said mounting plate to undergo translational vibration relative to said outer frame in said plate plane, wherein said translational vibration is induced in said mounting plate by the unbalance of the rotational body, to define a pivot axis perpendicular to said rotation axis, and to allow said mounting plate to undergo pivotal vibration about said pivot axis; and
   a first vibration transducer arrangement that is coupled to said outer frame and to said mounting plate, and that is so arranged and adapted to detect said translational vibration of said mounting plate relative to said outer frame in said plate plane;
   wherein said webs include a first pair of webs that extend along and parallel to said pivot axis respectively on opposite sides of said mounting plate and that define said pivot axis, said webs further include a second pair of webs and a third pair of webs that respectively extend parallel to each other and parallel to said first pair of webs in said plate plane, and said second pair of webs and said third pair of webs are located respectively spaced equidistantly from said pivot axis on opposite sides of said pivot axis.

37. An apparatus for determining an unbalance of a rotational body when said rotational body is mounted on said apparatus so as to be rotatable about a rotation axis, said apparatus comprising:
   a mounting plate extending along and defining a plate plane;
   a mounting fixture that is arranged on said mounting plate, and that is adapted to receive the rotational body mounted thereon so as to allow the rotational body to rotate about said rotation axis, wherein said rotation axis is oriented perpendicular to said plate plane;
   an outer frame arranged at least partially outwardly around said mounting plate;
   a plurality of webs respectively connecting said mounting plate to said outer frame, wherein said webs entirely support said mounting plate relative to said outer frame, said webs include a first pair of webs that extend axially aligned with one another along a pivot axis perpendicular to said rotation axis on opposite sides of said mounting plate and further webs offset away from said pivot axis, said webs of said first pair are torsionally flexible about said pivot axis to allow said mounting plate to undergo pivotal vibration about said pivot axis and are flexurally stiff with respect to bending perpendicular to said plate plane, and said further webs are flexible with respect to bending perpendicular to said plate plane so as to allow said pivotal vibration of said mounting plate and with respect to bending in said plate plane so as to allow said mounting plate to undergo translational vibration in said plate plane;

a first vibration transducer arrangement that is coupled to said outer frame and to said mounting plate, and that is so arranged and adapted to detect said translational vibration of said mounting plate relative to said outer frame in said plate plane; and a second vibration transducer arrangement that is coupled to said outer frame and to said mounting plate, and that is so arranged and adapted to detect said pivotal vibration of said mounting plate relative to said outer frame about said pivot axis.

38. The apparatus according to claim 37, wherein all of said further webs extend parallel relative to said webs of said first pair and relative to said pivot axis.

39. The apparatus according to claim 37, wherein all of said further webs extend respectively perpendicularly relative to said webs of said first pair and relative to said pivot axis.

40. The apparatus according to claim 37, wherein said further webs are arranged symmetrically on opposite sides of said pivot axis.

41. An apparatus for determining an unbalance of a rotational body when said rotational body is mounted on said apparatus so as to be rotatable about a rotation axis, said apparatus comprising:

a mounting plate extending along and defining a plate plane;

a mounting fixture that is arranged on said mounting plate, and that is adapted to receive the rotational body mounted thereon so as to allow the rotational body to rotate about said rotation axis, wherein said rotation axis is oriented perpendicular to said plate plane;

an outer frame arranged at least partially outwardly around said mounting plate;

a plurality of webs respectively connecting said mounting plate to said outer frame in an arrangement of said webs that is symmetrical relative to said rotation axis, wherein said webs are so configured and arranged so as to support said mounting plate relative to said outer frame, to transmit from said mounting plate to said outer frame all axially directed forces that are oriented along said rotation axis and that are not induced by the unbalance of the rotational body, and to allow said mounting plate to undergo translational vibration relative to said outer frame in said plate plane, wherein said translational vibration is induced in said mounting plate by the unbalance of the rotational body; and a first vibration transducer arrangement that is coupled to said outer frame and to said mounting plate, and that is so arranged and adapted to detect said translational vibration of said mounting plate relative to said outer frame in said plate plane;

wherein said webs are further so configured and arranged so as to define a pivot axis perpendicular to said rotation axis, and so as to allow said mounting plate to undergo pivotal vibration relative to said outer frame about said pivot axis, wherein said pivotal vibration is induced in said mounting plate by the unbalance of the rotational body;

further comprising a second vibration transducer arrangement that is coupled to said outer frame and to said mounting plate, and that is so arranged and adapted to detect said pivotal vibration of said mounting plate relative to said outer frame about said pivot axis; and wherein said mounting plate comprises a plate body on which said mounting fixture is arranged and an extension arm protruding outwardly from said plate body, said outer frame comprises a plurality of frame members arranged outwardly around said mounting plate and a frame protrusion that protrudes from at least one of said frame members away from said plate plane and that defines a clearance space therein, a free end of said extension arm extends into said clearance space, and said second vibration transducer arrangement is coupled to said free end of said extension arm and to said frame protrusion in said clearance space.

* * * * *

UNITED STATES PATENT AND TRADEMARK OFFICE
CERTIFICATE OF CORRECTION

,PATENT NO.    : 6,779,400 B1
DATED          : August 24, 2004
INVENTOR(S)    : Dieter Thelen et al.

It is certified that error appears in the above-identified patent and that said Letters Patent is hereby corrected as shown below:

<u>Title page,</u>
Item [56], References Cited, FOREIGN PATENT DOCUMENTS, before
"DE    2608891    9/1977" insert
-- DE    1237807    3/1967
   DE    1937865    1/1971 --;

<u>Column 1,</u>
Line 59, after "the axial", replace "direct ion" by -- direction --;

<u>Column 6,</u>
Line 64, after "so as to" delete "in";

<u>Column 9,</u>
Line 59, after "element", replace "11" by -- 1, --.

Signed and Sealed this

Fifteenth Day of March, 2005

JON W. DUDAS
*Director of the United States Patent and Trademark Office*